Nov. 12, 1940.  J. MacMANUS  2,220,971
METHOD OF FINISHING CAKE
Filed Feb. 13, 1939
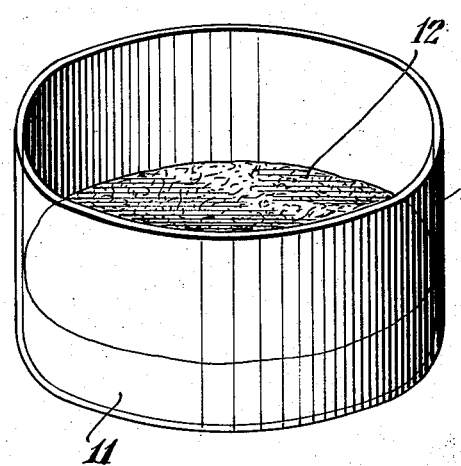
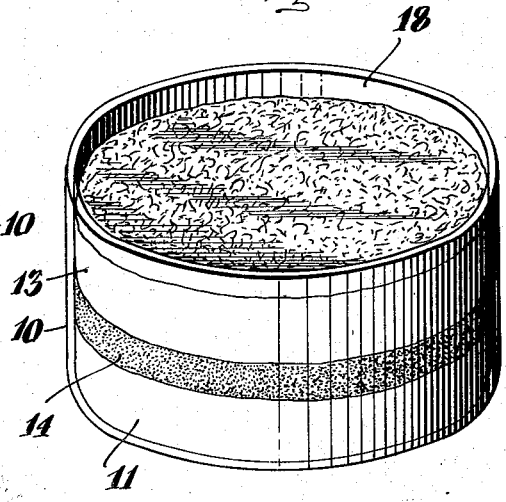
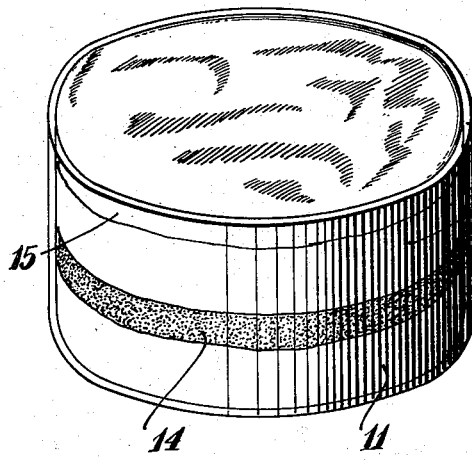
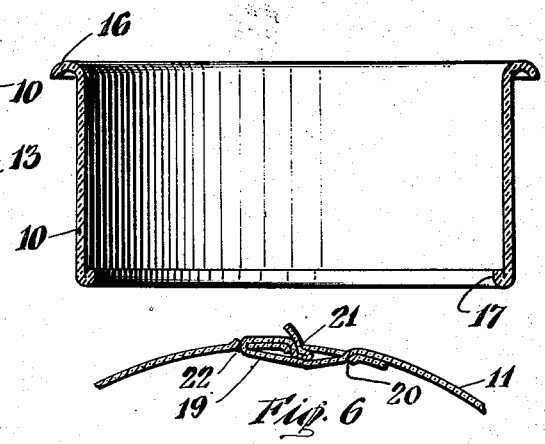
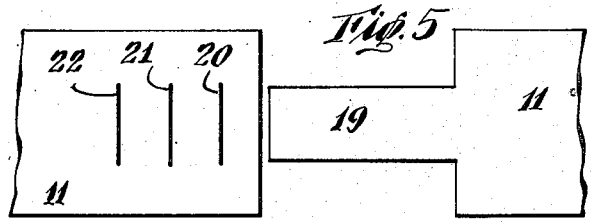
INVENTOR
John MacManus
BY
Cooper, Kerr + Dunham
ATTORNEYS Patented Nov. 12, 1940

2,220,971

UNITED STATES PATENT OFFICE 2,220,971

METHOD OF FINISHING CAKE

John MacManus, Yonkers, N. Y., assignor to Cushman's Sons Inc., New York, N. Y., a corporation of New York Application February 13, 1939, Serial No. 256,121

3 Claims. (Cl. 107—54)

This invention relates to improvements in baking procedure for finishing cakes, particularly layer cakes, in the containers in which they are to be handled, shipped and displayed.

In finishing layer cake, after the layers have been baked, it is customary to put filling and icing between the layers and on top of the cake respectively. The filling and icing may be of the same or different material. It is often desirable, especially in summer, to omit putting the icing or frosting on the cylindrical sides thereof because of its tendency to run. If the icing on the sides of the cake runs, it will be appreciated that the neat appearance is spoiled and hence the cake becomes unsalable. Another advantage of omitting icing or frosting on the sides is that the cake itself as well as the filling between the layers may be seen by the purchaser.

One object of my invention is to build a plurality of cake layers in a container, preferably made of transparent material, placing one layer on top of another with filling material between, and icing off the top of the completed cake; during the operation of spreading the filling between the layers, and the icing on top of the cake, the collar or container prevents the filling and icing from being pushed over onto the sides and it keeps the perimeter of the layers of icing and filling sharp and well defined. This adds greatly to the neatness and hence salability of the product. When the cake is built up without any collar or container it takes even a skilled baker longer to get the filling or icing to the same transverse dimensions of the layers. The shaping of the filling and icing is easily and more quickly accomplished even by unskilled workers when done in my collar or container.

After the cake has been built up and finished, the collar has the further advantage of protecting the cake from dust, moisture or dryness when it is handled, shipped and displayed to the customer. The collar or container, which can be easily slipped off when desired, may be made of a transparent material; this gives the further advantage that the purchaser may view the cake material and filling.

In the drawing:

Fig. 1 is a tilted view of a transparent container or collar showing the bottom layer inserted but before any filling has been spread on the top thereof.

Fig. 2 is the same as Fig. 1 except that the filling has been spread on the top of the bottom layer and top layer has been inserted but no icing or frosting has been spread on the top of the cake.

Fig. 3 is the same as Fig. 2 except that the icing or frosting has been spread on the top of the top layer.

Fig. 4 shows a slightly modified form of the collar or container in sectional elevation.

Fig. 5 is a plan view of a further modification showing the collar split and the ends thereof separated.

Fig. 6 is a sectional view of the modification shown in Fig. 5 but with the ends of the collar fastened together.

In the drawing, 10 is the cylindrical collar or container preferably made of flexible transparent material but my invention is not so limited for I contemplate using material which is inflexible or opaque as well. The material of the collar should however, be of such a stiffness that the collar will not collapse while the cake is being built up and finished within, in the manner hereinafter described.

In finishing the cake, a previously baked lower layer 11, which is cylindrical in shape, is inserted into the collar 10 from the top and slid down so that its bottom surface is approximately flush with the bottom of the collar. The layer should be of such a diameter that it will fit fairly snugly into the surrounding collar 10 for the latter acts as a shipping and handling container as well as for the function now to be described; however, the fit should not be too snug for when the cake is wanted for use it must be slid out of the surrounding collar. On the top 12 of bottom layer 11, filling 14 is spread as shown in Fig. 2. The filling may be quickly and evenly spread by an unskilled workman without danger of its being pushed over the edge of layer 11 for it is confined and embraced at its circumferential edge by the surrounding collar 10. In this way the diameter of the filling 14 will be the same as the diameter of the layer 11, giving to the finished cake that neat appearance which is so necessary to make articles of this class salable. After the filling 14 has been spread, another cake layer 13, cylindrical in shape and of the same diameter as bottom layer 11, is inserted in the collar 10 and slid down on top of said filling, leaving a cylindrical space 18 for the frosting or icing as shown in Fig. 2. Thereafter frosting or icing 15 is spread on the top side of layer 13, as shown in Fig. 3, and scraped level with the upper edge of the collar 10, thus completing the cake. If no icing is desired on top the cake, this step may be omitted.

From the above description it is apparent that the completed cake is in the form of a well nigh perfect cylinder. The layers 11 and 13 are baked in cylinders of the same diameter and enclosed in the collar 10 of approximately the same diameter; both the icing 15 and filling 14 are confined and supported by said collar. The surrounding collar gives sharply defined edges to both the icing and filling, which is most desirable for neatness, even when they are spread therein rapidly and by unskilled workmen. In fact it has been found in practice that when cakes are made without icing on the side in the normal manner without any surrounding collar, even with skilled bakers it takes much longer to even approximate the neat appearance which is so quickly and easily obtained by my method of making cakes of this class. The saving of time and expense in finishing layer cakes of this class is immense when many thousands are made at the same time.

After the cake has been completed in the collar as described, it is then shipped and displayed, the collar serving as a container during shipment and later as a display device, if transparent. Furthermore, the collar acts to keep the sides of the layers 11 and 12 and the filling 14 from drying during the period between making and using, while allowing the icing or frosting 15 to harden in the usual manner.

Whenever it is desired to take the cake out of the collar or container 10 the latter is grasped lightly by both hands and shaken and the cake slips out.

Fig. 4 shows the collar 10 empty but beaded outwardly at 16 and beaded inwardly at 17. These beadings are not shown in Figs. 1–3 and while not necessary to the practice of my invention yet are in some cases helpful. Top beading 16 is curled outwardly so as not to interfere with the insertion of the layers 11 and 13 and the spreading of icing 15 when the cake is being built up. This beading serves as a grasping ledge when the cake is being shaken out of collar 10 for use. The other or bottom beading 17 is curled inwardly and projects inwardly sufficiently to impede the cake against slipping out of the collar 10 during shipment or ordinary handling. When this lower bead is used, the cake is pushed from the bottom out through the top of the collar. A disc of oiled paper or other suitable material is made to adhere to the bottom of the cake so that pressure can be exerted thereon without spoiling the appearance of the cake. While, as stated, the container 10 may be made of various materials, I have found that transparent celluloid is quite satisfactory.

As a further modification I contemplate that the collar 11 may be split as shown in Figs. 5 and 6, so that the ends may be separated and the collar removed from the finished cake, instead of sliding the cake out of the collar, as previously described. For fastening the ends of the split collar I provide on one end thereof the tongue 19 which is inserted in slit 20, on the other, from the outside of the collar as shown in Fig 6 and pulled through, and then threaded from the inside through slit 22 and pulled through. The free end of the tongue 19 is then doubled over and inserted in the slit 21 from the outside thus holding the two ends of collar 11 together while in use. When it is desired to open the collar for removal, the free end of the loop of tongue 19 is seized and pulled out of slit 21 and the tongue may be easily slipped out of slits 22 and 20 and the collar removed from the cake. There are other fastenings which are known in other arts by which the ends of the split collar may be held together.

While I have described a layer cake of two layers in height and cylindrical in form, yet I contemplate using my invention in the making of cakes made up of any number of layers and of any shape, such as oval, triangular, square, oblong and the like. I use the words "filling" and "icing" as commonly employed, i. e., filling is the material between layers and icing is the material on top of the upper cake layer.

I claim:

1. In the manufacture of layer cake, the method of assembling a multi-layer cake and applying filling between layers and icing on top, which comprises placing in an embracing container a previously baked cake layer peripherally shaped to fit said container, then applying filling thereto and by the embracing container retaining all applied filling on top of the cake layer, and thereafter repeating the foregoing steps until the cake is completed with filling between all layers and icing upon the top of the top layer.

2. In the manufacture of cake having a plurality of layers with intermediate filling material, the steps of disposing within and at the lower part of a collar of wrapping material, a previously baked layer of cake material having peripheral shape and dimensions to fit said collar snugly, applying filling material to said layer while in the collar, disposing another like layer within the collar and on top of said layer of filling material, applying further filling material to the top of said second layer to complete the cake, and maintaining said collar in place while handling the cake for delivery.

3. In the manufacture of layer cake according to claim 1 including the further step of affording vertical support to the finished cake by supporting from below the marginal edge of the lowermost layer whereby the cake is prevented from slipping out of the container during handling and shipping.

JOHN MacMANUS.